April 21, 1925.
C. SMITH ET AL
STEAM WATER MIXER
Filed April 5, 1922
1,535,051
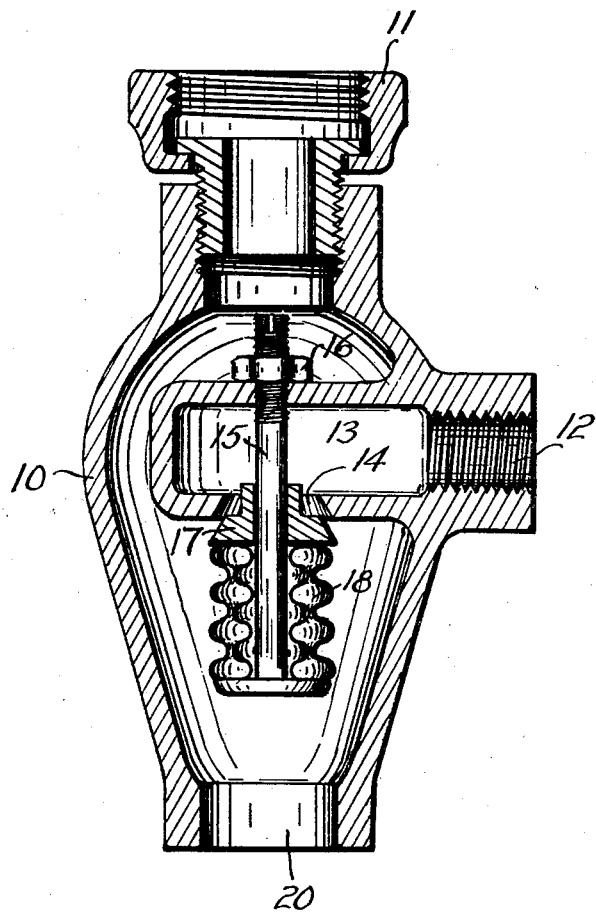
Inventors
CHETWOOD SMITH
CHARLES T. HAWLEY
By Attorneys
Southgate & Southgate Patented Apr. 21, 1925.

1,535,051

UNITED STATES PATENT OFFICE.

CHETWOOD SMITH, OF WORCESTER, AND CHARLES T. HAWLEY, OF HOLDEN, MASSACHUSETTS, ASSIGNORS TO STACK HEATER COMPANY, OF BOSTON, MASSACHUSETTS, A CORPORATION OF MASSACHUSETTS.

STEAM-WATER MIXER.

Application filed April 5, 1922. Serial No. 549,792.

*To all whom it may concern:*

Be it known that we, CHETWOOD SMITH and CHARLES T. HAWLEY, citizens of the United States, respectively, residing at Worcester and Holden, in the county of Worcester and State of Massachusetts, have invented a new and useful Steam-Water Mixer, of which the following is a specification.

This invention relates to a device by which water may be heated by mixing live steam therewith as the water flows through the device. Such devices, commonly known as "steam-water mixers", are in use in factories and other commercial establishments to furnish a convenient supply of hot water wherever live steam under pressure is available. They are particularly useful in supplying water for wash sinks and other places where hot water is required only occasionally but then in considerable quantities.

It is one object of our invention to provide a device of this character in which novel provision is made to prevent backward flow of water into the steam pipe in the event of an excess of water pressure.

Another object is to provide a steam-water mixer having automatic means to control and regulate the temperature of the water delivered therefrom, so that water of any desired temperature may be supplied. In the preferred form a thermostatic member regulates the temperature, acting in conjunction with the means for preventing back flow of water through the steam inlet.

Our invention further relates to arrangements and combinations of parts hereinafter described and more particularly pointed out in the appended claims.

A preferred form of our invention is shown in the drawing which is a sectional elevation of our improved steam-water mixer.

Referring to the drawing, we have shown a casing 10 having a water inlet connection 11 and a steam inlet passage 12 leading to an inner casing or chamber 13 having a port 14 in its lower side, said inner casing forming a steam inlet member.

A headed stud 15 is threaded in the upper wall of the chamber 13 and extends centrally through the port or opening 14. A check nut 16 is provided for locking the stud 15 and the threaded upper end of the stud is slotted to receive a screw driver for adjustment thereof.

A valve 17 is loosely mounted to slide on the stud 15 and when in its raised position fits closely within the port 14. A thermostatic member 18 is also mounted on the lower end of the headed stud 15, said member being preferably in the form of an annular metal bellows slidable on the stud. A discharge or delivery outlet 20 is provided at the lower end of the casing 10.

Having described the construction of our improved mixer, the operation thereof is as follows: Water and steam being admitted through the inlet passages 11 and 12, the steam passes through the port or opening 14 and is thoroughly mixed with the water by the spreading action of the conical valve 17. If the back pressure of the water in the casing 10 is greater than the steam pressure in the chamber 13, the valve 17 will be moved upward by the flow of water toward the port 14 and will act as a check valve to prevent back flow of water through the steam inlet connections. The thermostatic member 18 is commonly of a light construction which permits this member to act as a float, assisting the valve 17 in its upward or checking movement.

The member 18 is also expanded by any increase in the temperature of the hot water discharged from the mixer and when the water reaches a predetermined temperature, the expansion of the member 18 will be such as to force the valve 17 to or toward its seat, reducing the flow of steam through the port 14 and preventing further rise of temperature in the water. The member 18 therefore automatically controls the temperature of the hot water delivered through the discharge opening 20. The temperature at which the thermostat acts may be changed by adjusting the stud 15 up or down in its fixed support.

Having thus described our invention, it will appear that we have provided a very simple construction which effectually prevents back flow of water through the steam connections and which also provides for delivering water at any desired temperature therefrom.

Having thus described our invention, we do not wish to be limited to the details herein disclosed otherwise than as set forth in the claims, but what we claim is:—

1. A steam-water mixer comprising a casing having a steam inlet, a steam inlet member projecting within said casing and having a downward opening, a combined conical check valve and steam spreader mounted below said opening and normally spaced therefrom, said combined valve and spreader being freely movable upward to close said steam inlet opening upon the occurrence of excessive relative water pressure.

2. A steam-water mixer comprising a casing having a steam inlet opening, a steam inlet member projecting within said casing, said member having a port in its lower side, a stud adjustably secured to said member and extending through said port, and a check valve effective to prevent reverse flow of water through said steam inlet port, said valve being freely slidable on said stud and adapted to close said port when in raised position.

3. A steam-water mixer comprising a casing having a steam inlet opening, a steam inlet member projecting within said casing, said member having a port in its lower side, a stud adjustably secured to said member and extending through said port, a check valve effective to prevent reverse flow of water through said steam inlet port, said valve being freely slidable on said stud and adapted to seat in said port, and a thermostatic member effective by expansion to force said valve to its seat.

4. A steam-water mixer comprising a casing having a steam inlet opening, a steam inlet member projecting within said casing, said member having a port in its lower side, a stud adjustably secured to said member and extending through said port, a valve slidable on said stud, and an annular thermostatic member also slidable on said stud and effective by expansion to force said valve to its seat.

5. A steam-water mixer comprising a casing having a steam inlet opening and a downwardly directed water inlet, a steam inlet member projecting into the path of the water entering through said water inlet and having a downward opening, and a conical steam spreader positioned below said opening and in the path of the steam passing therethrough.

In testimony whereof we have hereunto affixed our signatures.

CHETWOOD SMITH.
CHARLES T. HAWLEY.